US012175935B2

(12) United States Patent
Lim et al.

(10) Patent No.: US 12,175,935 B2
(45) Date of Patent: Dec. 24, 2024

(54) DISPLAY DEVICE

(71) Applicant: LG Display Co., Ltd., Seoul (KR)

(72) Inventors: Hyunkyo Lim, Paju-si (KR); Dongsup Sim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/399,209

(22) Filed: Dec. 28, 2023

(65) Prior Publication Data

US 2024/0257736 A1 Aug. 1, 2024

(30) Foreign Application Priority Data

Jan. 31, 2023 (KR) ........................ 10-2023-0012675

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0819* (2013.01); *G09G 2300/0842* (2013.01); *G09G 2320/0204* (2013.01); *G09G 2320/0233* (2013.01); *G09G 2330/12* (2013.01); *G09G 2340/0435* (2013.01)

(58) Field of Classification Search
None
See application file for complete search history.

(56) References Cited

U.S. PATENT DOCUMENTS

2011/0084953 A1* 4/2011 Lee ........................ G06F 1/3265 345/82
2018/0197446 A1* 7/2018 Lee ...................... G09G 3/3677

FOREIGN PATENT DOCUMENTS

KR 10-2014-0011676 A 1/2014

* cited by examiner

*Primary Examiner* — Stephen T. Reed
(74) *Attorney, Agent, or Firm* — Fenwick & West LLP

(57) ABSTRACT

A display apparatus includes a pixel row including a plurality of pixels. Each pixel includes a driving transistor that provides a driving current to a light emitting element, and includes a gate electrode, a first electrode, and a second electrode. The first transistor includes a gate electrode that receives a first scan signal, a first electrode receives a data voltage, and a second electrode. The second transistor includes a gate electrode that receives a second scan signal, a first electrode that receives an initialization voltage, and a second electrode. A ripple detection unit detects ripples that occur in pixel rows in the display apparatus. A compensation image data calculation unit calculates the magnitude of the compensation image data based on the difference between the voltage level of the initialization voltage of a pixel row in which the ripple occurs and a reference initialization voltage level.

11 Claims, 9 Drawing Sheets

DISPLAY DEVICE

CROSS REFERENCE TO RELATED APPLICATION

The present application claims benefit of Republic of Korea Patent Application No. 10-2023-0012675, filed on Jan. 31, 2023, which is hereby incorporated by reference in its entirety.

BACKGROUND

Technical Field

The present disclosure relates to a display apparatus.

Description of the Related Art

As the information society develops, various demands for display apparatuses for displaying images are increasing, and various types of display apparatuses such as a liquid crystal display and an organic light emitting diode display are utilized.

Images displayed on a display apparatus may be still images or moving images, and the moving image may include various types such as sports images, game images, and movies. The display apparatus is driven in a variable refresh rate (VRR) mode in which a driving frequency varies depending on the type of an image, thereby reducing power consumption and extending the lifespan of the display apparatus.

When the variable refresh rate mode is applied to drive pixel circuits at various refresh rates, a luminance difference occurs between the pixel circuits due to different refresh rates, thereby causing quality degradation such as image distortion or flicker.

SUMMARY

The specification is directed to providing a display apparatus capable of preventing a Mura phenomenon by a ripple of a first initialization voltage.

The objects of the specification are not limited to the above-described object, and other technical objects may be inferred from embodiments below.

A display apparatus according to one embodiment for achieving the object includes a first pixel row including the plurality of pixels each including the driving transistor including the gate electrode connected to the first node, the first electrode connected to the second electrode, and the second electrode connected to the third node and for providing the driving current to the light emitting element, the first transistor including the gate electrode to which the first scan signal is applied, the first electrode for receiving the data voltage, and the second electrode connected to the second node, and the second transistor including the gate electrode to which the second scan signal is applied, the first electrode for receiving the initialization voltage, and the second electrode connected to the anode electrode of the light emitting element, a ripple detection unit for detecting that a ripple of the initialization voltage connected to the first pixel row occurs in the first pixel row period in the first frame among a plurality of frames and detecting a difference between the voltage level of the initialization voltage of the first pixel row in which the ripple occurs and a reference initialization voltage level, and the compensation image data calculation unit for calculating the magnitude of the compensation image data based on the detected difference between the voltage level of the initialization voltage of the first pixel row in which the ripple occurs and the reference initialization voltage level.

Detailed matters of other embodiments are included in a detailed description and accompanying drawings.

According to the embodiments, it is possible to prevent the Mura phenomenon by the ripple of the first initialization voltage.

However, the effects obtainable from the specification are not limited to the above-described effects, and other effects that are not mentioned will be able to be clearly understood by those skilled in the art to which the specification pertains from the following description.

DETAILED DESCRIPTION

Figure 1:
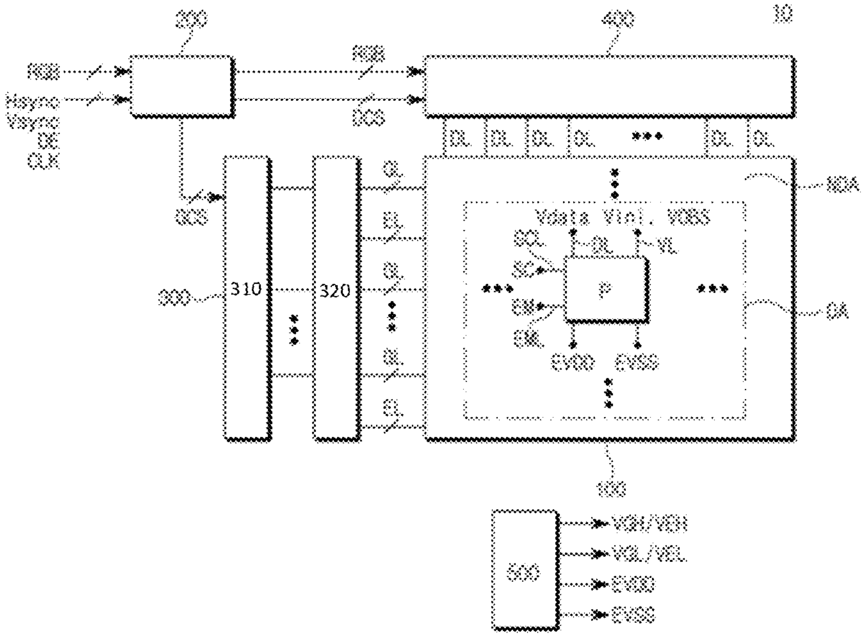
FIG. 1 is a block diagram schematically illustrating a display apparatus according to one embodiment.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically illustrating a display apparatus according to one embodiment.

Referring to FIG. 1, a display apparatus 1 includes a display panel 100 including a plurality of pixels P, a controller 200, a gate driving unit 300 for supplying gate signals to each of the plurality of pixels P, a data driving unit 400 for supplying data signals to each of the plurality of pixels P, and a power supply unit 500 for supplying power required for driving each of the plurality of pixels P.

The display panel 100 includes a display area AA (see FIG. 2) in which the pixel P is positioned and a non-display area NA (see FIG. 2) which is disposed to surround the display area AA and in which the gate driving unit 300 and the data driving unit 400 are disposed.

In the display panel 100, a plurality of gate lines GL and a plurality of data lines DL cross each other, and each of the plurality of pixels P is connected to the gate line GL and the data line DL. Specifically, one pixel P receives the gate signals from the gate driving unit 300 through the gate line GL, receives data signals from the data driving unit 400 through the data line DL, and receives a high-potential driving voltage EVDD and a low-potential driving voltage EVSS from the power supply unit 500.

Here, a scan signal SC and a light emitting control signal EM are supplied through the gate line GL, and a data voltage Vdata is supplied through the data line DL. In addition, according to various embodiments, the gate line GL may include a plurality of scan lines SCL through which the scan signal SC is supplied and a light emitting control signal line EML through which the light emitting control signal EM is supplied. In addition, the plurality of pixels P may additionally include a power supply line VL to receive a bias voltage Vobs and initialization voltages Var and Vini.

Figure 2:
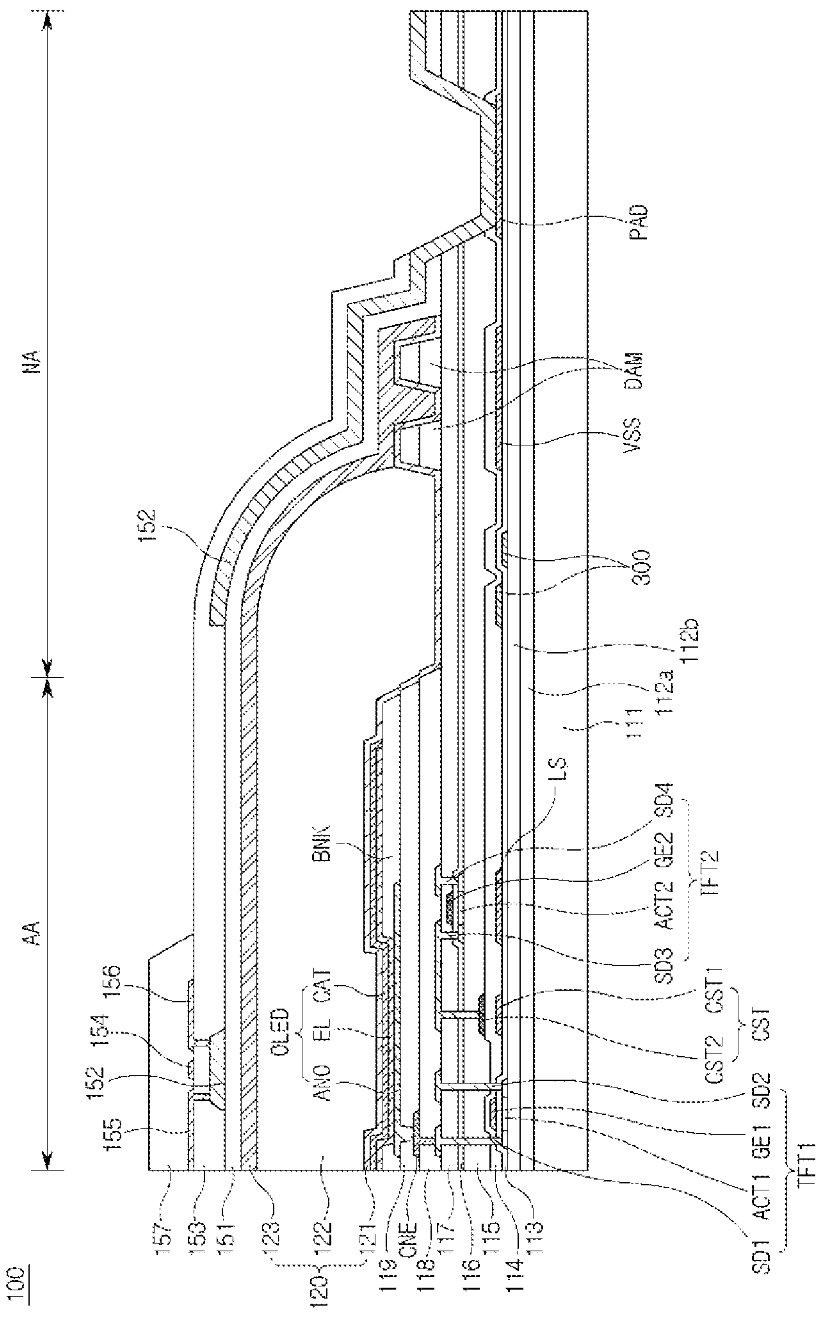
FIG. 2 is a cross-sectional view illustrating a stacked form of the display apparatus according to one embodiment.

In addition, as illustrated in FIG. 2, each of the pixels P includes a light emitting element EL and a pixel circuit for controlling the driving of the light emitting element EL. Here, the light emitting element EL includes an anode electrode ANO, a cathode electrode CAT, and a light emitting layer EL between the anode electrode ANO and the cathode electrode CAT.

The pixel circuit includes a plurality of switching elements, a driving element, and a capacitor. Here, the switching element and the driving element may be formed of thin film transistors. In the pixel circuit, the driving element adjusts the amount of light emitted from the light emitting element EL by controlling the amount of current supplied to the light emitting element EL according to the data voltage. In addition, the plurality of switching elements operate the pixel circuits after receiving the scan signals SC supplied through the plurality of scan lines SCL and the light emitting control signal EM supplied through the light emitting control line EML.

The display panel 100 may be implemented as a non-transmissive display panel or a transmissive display panel. The transmissive display panel may be applied to a transparent display apparatus in which an image is displayed on a screen and a real object in the background is visible. The display panel 100 may be manufactured as a flexible display panel. The flexible display panel may be implemented as an organic light emitting diode (OLED) panel using a plastic substrate.

Each of the pixels P may be divided into a red pixel, a green pixel, and a blue pixel to implement colors. Each of the pixels P may further include a white pixel. Each of the pixels P includes the pixel circuit.

Touch sensors may be disposed on the display panel 100. Touch input may be detected by using separate touch sensors or detected through the pixels P. The touch sensors are on-cell type or add-on type touch sensors and may be implemented as an in-cell type touch sensors disposed on the screen of the display panel or embedded into the display panel 100.

The controller 200 processes image data RGB input from the outside to fit a size and a resolution of the display panel 100 and supplies the processed image data RGB to the data driving unit 400. The controller 200 generates a gate control signal GCS and a data control signal DCS using synchronization signals, for example, a dot clock signal CLK, a data enable signal DE, a horizontal synchronization signal Hsync, and a vertical synchronization signal Vsync input from the outside. The gate driving unit 300 and the data driving unit 400 are controlled by supplying the generated gate control signal GCS and data control signal DCS to the gate driving unit 300 and the data driving unit 400, respectively.

The controller 200 may be configured by being coupled to various processors, for example, a microprocessor, a mobile processor, an application processor, and the like depending on a device to be mounted.

A host system may be any one of a television (TV) system, a set-top box, a navigation system, a personal computer (PC), a home theater system, a mobile device, a wearable device, and a vehicle system.

The controller 200 may control operation timings of a display panel driving unit at a frame frequency of an input frame frequency Xi (i is a positive integer greater than zero) Hz by multiplying the input frame frequency by i times. The input frame frequency is 60 Hz in a national television standards committee (NTSC) type and 50 Hz in a phase-alternating line (PAL) type.

The controller 200 generates signals so that the pixel P may be driven at various refresh rates. In other words, the controller 200 generates signals connected with driving so that the pixel P is driven in a variable refresh rate (VRR) mode or to be switched between a first refresh rate and a second refresh rate. For example, the controller 200 may drive the pixel P at various refresh rates by simply changing rates of clock signals, generating synchronization signals to generate a horizontal blank or a vertical blank, or driving the gate driving unit 300 by a mask method.

The controller 200 generates the gate control signal GCS for controlling an operation timing of the gate driving unit 300 and the data control signal DSC for controlling an operation timing of the data driving unit 400 based on timing signals Vsync, Hsync, and DE received from the host system. The controller 200 synchronizes the gate driving unit 300 and the data driving unit 400 by controlling the operation timings of the display panel driving unit.

A voltage level of the gate control signal GCS output from the controller 200 may be converted into gate-on voltages VGL and VEL and gate-off voltages VGH and VEH through a level shifter (not illustrated) and supplied to the gate driving unit 300. The level shifter converts a low-level voltage of the gate control signal GCS into the gate low voltage VGL and converts a high-level voltage of the gate control signal GCS into the gate high voltage VGH. The gate control signal GCS includes a start pulse and a shift clock.

The gate driving unit 300 supplies the scan signal SC to the gate line GL according to the gate control signal GCS supplied from the controller 200. The gate driving unit 300 may be disposed at one side or both sides of the display panel 100 by a gate in panel (GIP) method.

The gate driving unit 300 sequentially outputs the gate signals to the plurality of gate lines GL under the control of the controller 200. The gate driving unit 300 may shift the gate signals using the shift register to sequentially supply the signals to the gate lines GL.

The gate signal may include the scan signal SC and the light emitting control signal EM in an OLED display device. The scan signal SC includes a scan pulse that swings between the gate-on voltage VGL and the gate-off voltage VGH. The light emitting control signal EM may include a light emitting control signal pulse that swings between the gate-on voltage VEL and the gate-off voltage VEH.

The scan pulse is synchronized with the data voltage Vdata to select pixels P in a line in which data is written. The light emitting control signal EM defines light emitting times of the pixels P.

The gate driving unit 300 may include a light emitting control signal driver 310 and at least one scan driver 320.

The light emitting control signal driver 310 outputs the light emitting control signal pulse in response to the start pulse and the shift clock from the controller 200 and sequentially shifts the light emitting control signal pulse according to the shift clock.

At least one scan driver 320 outputs the scan pulse in response to the start pulse and the shift clock from the controller 200 and shifts the scan pulse according to a shift clock timing.

The data driving unit 400 converts the image data RGB into the data voltage Vdata according to the data control signal DCS supplied from the controller 200 and supplies the converted data voltage Vdata to the pixel P through the data line DL.

In FIG. 1, the data driving unit 400 is illustrated as being disposed at one side of the display panel 100 as a single data driving unit, but the number and arrangement positions of data driving units 400 are not limited thereto.

In other words, the data driving unit 400 may be formed of a plurality of integrated circuits (IC) and disposed separately as a plurality of data driving units at one side of the display panel 100.

The power supply unit 500 generates direct current (DC) power required for driving a pixel array and the display panel driving unit of the display panel 100 using a DC-DC converter. The DC-DC converter may include a charge pump, a regulator, a buck converter, a boost converter, and the like. The power supply unit 500 may receive a DC input voltage applied from the host system (not illustrated) and generate DC voltages such as the gate-on voltage VGL and VEL, the gate-off voltages VGH and VEH, the high-potential driving voltage EVDD, and the low-potential driving voltage EVSS. DC voltages such as gate-off voltages VGH and VEH, a high-potential driving voltage EVDD, and a low-potential driving voltage EVSS may be generated. The gate-on voltages VGL and VEL and the gate-off voltages VGH and VEH are supplied to the level shifter (not illustrated) and the gate driving unit 300. The high-potential driving voltage EVDD and the low-potential driving voltage EVSS are commonly supplied to the pixels P.

FIG. 2 is a cross-sectional view illustrating a stacked form of the display apparatus according to one embodiment.

FIG. 2 is a cross-sectional view including two switching thin film transistors TFT1 and TFT2 and one capacitor CST. The two thin film transistors TFT1 and TFT2 include any one thin film transistor of a switching thin film transistor and a driving transistor including a polycrystalline semiconductor material and the oxide thin film transistor TFT2 including an oxide semiconductor material. In this case, the thin film transistor including the polycrystalline semiconductor material is referred to as the polycrystalline thin film transistor TFT1, and the thin film transistor including the oxide semiconductor material is referred to as the oxide thin film transistor TFT2.

The polycrystalline thin film transistor TFT1 illustrated in FIG. 2 is an emission switching thin film transistor connected to a light emitting element OLED, and the oxide thin film transistor TFT2 is any one switching thin film transistor connected to a capacitor CST.

One pixel P includes the light emitting element OLED and a pixel driving circuit for applying a driving current to the light emitting element OLED. The pixel driving circuit is disposed on a substrate 111, and the light emitting element OLED is disposed on the pixel driving circuit. In addition, an encapsulation layer 120 is disposed on the light emitting element OLED. The encapsulation layer 120 protects the light emitting element OLED.

The pixel driving circuit may indicate one pixel P array unit including a driving thin film transistor, a switching thin film transistor, and a capacitor. In addition, the light emitting element OLED may indicate an array unit for light emission including an anode electrode, a cathode electrode, and a light emitting layer disposed therebetween.

In one embodiment, the driving thin film transistor and at least one switching thin film transistor use an oxide semiconductor as an active layer. The thin film transistor using the oxide semiconductor material as an active layer has the excellent leakage current blocking effect and has the relatively inexpensive manufacturing cost compared to the thin film transistor using the polycrystalline semiconductor material as the active layer. Therefore, in order to reduce power consumption and reduce the manufacturing cost, the pixel driving circuit according to one embodiment includes the driving thin film transistor and at least one switching thin film transistor, which use the oxide semiconductor material.

All of the thin film transistors constituting the pixel driving circuit may be implemented by using the oxide semiconductor material, and only some of the switching thin film transistors may be implemented by using the oxide semiconductor material.

However, since it is difficult to secure the reliability of the thin film transistor using the oxide semiconductor material and the thin film transistor using the polycrystalline semiconductor material has a fast operation speed and excellent reliability, in one embodiment, the switching thin film transistor using the oxide semiconductor material and the switching thin film transistor using the polycrystalline semiconductor material are all included.

The substrate 111 may be formed of a multi-layer in which organic and inorganic films are alternately stacked. For example, the substrate 111 may include the organic film such as polyimide and the inorganic film such as silicon oxide ($SiO_2$), which are alternately stacked.

A lower buffer layer 112*a* is formed on the substrate 111. The lower buffer layer 112*a* is intended to block moisture or the like that may be introduced from the outside and may be used by stacking a plurality of silicon oxide ($SiO_2$) layers or the like. An auxiliary buffer layer 112*b* may be further disposed on the lower buffer layer 112*a* to protect the elements from the introduction of moisture.

The polycrystalline thin film transistor TFT1 is formed on the substrate 111. The polycrystalline thin film transistor TFT1 may use the polycrystalline semiconductor as the active layer. The polycrystalline thin film transistor TFT1 includes a first active layer ACT1 including a channel through which electrons or holes move, a first gate electrode GE1, a first source electrode SD1, and a first drain electrode SD2.

The first active layer ACT1 includes a first channel area, a first source area disposed at one side thereof with the first channel area interposed therebetween, and a first drain area disposed at the other side thereof.

The first source area and the first drain area are areas electrically conducted by an intrinsic polycrystalline semiconductor material doped with a group 5 or group 3 impurity ion, for example, phosphorus (P) or boron (B) at a predetermined concentration. The first channel area is an area in which the polycrystalline semiconductor material maintains an intrinsic state and provides a path through which electrons or holes move.

Meanwhile, the polycrystalline thin film transistor TFT1 includes the first gate electrode GE1 overlapping the first channel area of the first active layer ACT1. A first gate insulating layer 113 is disposed between the first gate electrode GE1 and the first active layer ACT1. The first gate insulating layer 113 may be used by stacking one inorganic layer or a plurality of inorganic layers, such as a silicon oxide ($SiO_2$) film or a silicon nitride (SiNx) film.

In one embodiment, the polycrystalline thin film transistor TFT1 has a top gate structure in which the first gate electrode GE1 is positioned above the first active layer ACT1. Therefore, a first electrode CST1 included in the capacitor CST and a light shielding layer LS included in the oxide thin film transistor TFT2 may be made of the same material as the first gate electrode GE1. It is possible to reduce the number of mask processes by forming the first gate electrode GE1, the first electrode CST1, and the light shielding layer LS through one mask process.

The first gate electrode GE1 is made of a metal material. For example, the first gate electrode GE1 may be formed of one layer or a plurality of layers made of any one of molybdenum (Mo), aluminum (Al), chromium (Cr), gold (Au), titanium (Ti), nickel (Ni), neodymium (Nd), and copper (Cu) or an alloy thereof, but is not limited thereto.

A first interlayer insulating layer 114 is disposed on the first gate electrode GE1. The first interlayer insulating layer 114 may be made of silicon oxide (SiO2), silicon nitride (SiNx), or the like.

The display panel 100 may further include an upper buffer layer 115, a second gate insulating layer 116, and a second interlayer insulating layer 117 sequentially disposed on the first interlayer insulating layer 114, and the polycrystalline thin film transistor TFT1 includes the first source electrode SD1 and the first drain electrode SD2 formed on the second interlayer insulating layer 117 and connected to the first source area and the first drain area, respectively.

The first source electrode SD1 and the first drain electrode SD2 may be formed of one layer or a plurality of layers made of any one of molybdenum (Mo), aluminum (Al), chromium (Cr), gold (Au), titanium (Ti), nickel (Ni), and neodymium (Nd) or an alloy thereof, but is not limited thereto.

The upper buffer layer 115 separates a second active layer ACT2 of the oxide thin film transistor TFT2 made of the oxide semiconductor material from the first active layer ACT1 made of the polycrystalline semiconductor material and provides the base capable of forming the second active layer ACT2.

The second gate insulating layer 116 covers the second active layer ACT2 of the oxide thin film transistor TFT2. Since the second gate insulating layer 116 is formed on the second active layer ACT2 made of the oxide semiconductor material, the second gate insulating layer 116 is implemented as an inorganic film. For example, the second gate insulating layer 116 may be made of silicon oxide (SiO2), silicon nitride (SiNx), or the like.

The second gate electrode GE2 is made of a metal material. For example, the second gate electrode GE2 may be formed of one layer or a plurality of layers made of any one of molybdenum (Mo), aluminum (Al), chromium (Cr), gold (Au), titanium (Ti), nickel (Ni), neodymium (Nd), and copper (Cu) or an alloy thereof, but is not limited thereto.

Meanwhile, the oxide thin film transistor TFT2 includes the second active layer ACT2 formed on the upper buffer layer 115 and made of the oxide semiconductor material, the second gate electrode GE2 disposed on the second gate insulating layer 116, and a second source electrode SD3 and a second drain electrode SD4 disposed on the second interlayer insulating layer 117.

The second active layer ACT2 includes an intrinsic second channel area made of the oxide semiconductor material and not doped with impurities and a second source area and a second drain area electrically conducted by being doped with impurities.

The oxide thin film transistor TFT2 further includes the light shielding layer LS positioned under the upper buffer layer 115 and overlapping the second active layer ACT2. The light shielding layer LS can secure the reliability of the oxide thin film transistor TFT2 by shielding light entering an active layer 401. The light shielding layer LS may be made of the same material as the first gate electrode GE1 and formed on an upper surface of the first gate insulating layer 113. The light shielding layer LS may be electrically connected to the second gate electrode GE2 to form a dual gate.

The second source electrode SD3 and the second drain electrode SD4 may be formed on the second interlayer insulating layer 117 with the same material simultaneously together with the first source electrode SD1 and the first drain electrode SD2, thereby reducing the number of mask processes.

Meanwhile, the capacitor CST may be implemented by arranging a second electrode CST2 on the first interlayer insulating layer 114 to overlap the first electrode CST1. The second electrode CST2 may be formed of one layer or a plurality of layer, for example, made of any one of molybdenum (Mo), aluminum (Al), chromium (Cr), gold (Au), titanium (Ti), nickel (Ni), neodymium (Nd), and copper (Cu) or an alloy thereof.

The capacitor CST stores the data voltage applied through the data line DL for a predetermined period and then provides the data voltage to the light emitting element OLED. The capacitor CST includes two electrodes corresponding to each other and a dielectric disposed therebetween. The first interlayer insulating layer 114 is positioned between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. However, the present disclosure is not limited thereto, and the connection relationship of the capacitor CST may vary depending on the pixel driving circuit.

Meanwhile, a first planarization layer 118 and a second planarization layer 119 are sequentially disposed on the pixel driving circuit to planarize an upper end of the pixel driving circuit. The first planarization layer 118 and the second planarization layer 119 may be formed of an organic film such as polyimide or acrylic resin.

In addition, the light emitting element OLED is formed on the second planarization layer 119.

The light emitting element OLED includes an anode electrode ANO, a cathode electrode CAT, and a light emitting layer EL disposed between the anode electrode ANO and the cathode electrode CAT. When the pixel driving circuit commonly using the low-potential voltage connected to the cathode electrode CAT is implemented, the anode electrode ANO is disposed as a separate electrode for each sub-pixel. When the pixel driving circuit commonly using the high-potential voltage is implemented, the cathode electrode CAT may be disposed as a separate electrode for each sub-pixel.

The light emitting element OLED is electrically connected to the driving element through a central electrode CNE disposed on the first planarization layer 118. Specifically, the anode electrode ANO of the light emitting element OLED and the first source electrode SD1 of the polycrystalline thin film transistor TFT1 forming the pixel driving circuit are connected by the central electrode CNE.

The anode electrode ANO is connected to the central electrode CNE exposed through a contact hole passing through the second planarization layer 119. In addition, the central electrode CNE is connected to the first source electrode SD1 exposed through a contact hole passing through the first planarization layer 118.

The central electrode CNE functions as a medium connecting the first source electrode SD1 to the anode electrode ANO. The central electrode CNE may be made of a conductive material such as copper (Cu), silver (Ag), molybdenum (Mo), or titanium (Ti).

The anode electrode ANO may be formed in a multi-layer structure including a transparent conductive film and an opaque conductive film with high reflection efficiency. The transparent conductive film may be made of a material with a relatively greater work function value, such as indium-tin-oxide (ITO) or indium-zinc-oxide (IZO), and the opaque conductive layer may be formed in a one layer or multi-layer structure containing aluminum (Al), silver (Ag), copper (Cu), lead (Pb), molybdenum (Mo), titanium (Ti), or an alloy thereof. For example, the anode electrode ANO may be formed in a structure in which the transparent conductive film, the opaque conductive film, and the transparent conductive film are sequentially stacked or formed in a structure in which the transparent conductive film and the opaque conductive film are sequentially stacked.

The light emitting layer EL is formed by stacking a hole-related layer, an organic light emitting layer, and an electron-related layer on the anode electrode ANO sequentially or in reverse order.

A bank layer BNK may be a pixel defining film that exposes the anode electrode ANO of each pixel P. The bank layer BNK may be made of an opaque material (e.g., black matrix) to prevent light interference between adjacent pixels P. In this case, the bank layer BNK includes a light shielding material made of at least any one of color pigment, organic black, and carbon. A spacer 700 may be further disposed on the bank layer BNK.

The cathode electrode CAT faces the anode electrode ANO with the light emitting layer EL interposed therebetween and is formed on an upper surface and a side surface of the light emitting layer EL. The cathode electrode CAT may be formed integrally throughout the display area AA. When applied to a top emission type OLED display device, the cathode electrode CAT may be formed of a transparent conductive film such as ITO or IZO.

The encapsulation layer 120 for suppressing the introduction of moisture may be further disposed on the cathode electrode CAT.

The encapsulation layer 120 may block the introduction of external moisture or oxygen into the light emitting element EL vulnerable to external moisture or oxygen. To this end, the encapsulation layer 120 may include at least one inorganic encapsulation layer and at least one layer organic encapsulation layer, but is not limited thereto. In the specification, a structure of the encapsulation layer 120 in which a first encapsulation layer 121, a second encapsulation layer 122, and a third encapsulation layer 123 are sequentially stacked will be described as an example.

The first encapsulation layer 121 is formed on the substrate 111 on which the cathode electrode CAT is formed. The third encapsulation layer 123 may be formed on the substrate 111 on which the second encapsulation layer 122 is formed and formed to surround an upper surface, a lower surface, and a side surface of the second encapsulation layer 122 together with the first encapsulation layer 121. The first encapsulation layer 121 and the third encapsulation layer 123 can minimize or prevent external moisture or oxygen from flowing into the light emitting element EL. The first encapsulation layer 121 and the third encapsulation layer 123 may be made of an inorganic insulating material capable of low-temperature deposition, such as silicon nitride (SiNx), silicon oxide (SiOx), silicon oxynitride (SiON), or aluminum oxide (Al2O3). Since the first encapsulation layer 121 and the third encapsulation layer 123 are deposited in a low temperature atmosphere, it is possible to prevent damage to the light emitting element EL vulnerable to a high temperature atmosphere in a deposition process of the first encapsulation layer 121 and the third encapsulation layer 123.

The second encapsulation layer 122 may function as a buffer for mitigating stress between the layers due to the bending of the display apparatus 10 and planarize step differences between the layers. The second encapsulation layer 122 may be formed on the substrate 111 on which the first encapsulation layer 121 is formed with a non-photosensitive organic insulating material such as acrylic resin, epoxy resin, phenolic resin, polyamide resin, polyimide resin, and polyethylene or silicon oxycarbon (SiOC), or a photosensitive organic insulating material such as photoacrylic, but is not limited thereto. When the second encapsulation layer 122 is formed through an inkjet method, a dam DAM may be disposed to prevent the second encapsulation layer 122 in a liquid form from spreading to an edge of the substrate 111. The dam DAM may be disposed closer to the edge of the substrate 111 than the second encapsulation layer 122. The dam DAM can prevent the second encapsulation layer 122 from spreading to a pad area in which a conductive pad disposed at an outermost side of the substrate 111 is disposed.

The dam DAM may be designed to prevent the spreading of the second encapsulation layer 122, but when the second encapsulation layer 122 is formed to exceed a height of the dam DAM in the process, the second encapsulation layer 122, which is an organic layer, may be exposed to the outside, and thus moisture or the like may easily flow into the light emitting element. Therefore, in order to prevent this, at least 10 dams DAM may be formed to overlap each other.

The dam DAM may be disposed on the second interlayer insulating layer 117 in the non-display area NA.

In addition, the dam DAM may be formed simultaneously with the first planarization layer 118 and the second planarization layer 119. When the first planarization layer 118 is formed, a lower layer of the dam DAM may be formed together, and when the second planarization layer 119 is formed, an upper layer of the dam DAM may be formed together, and thus the dam DAM may be formed by being stacked in a double structure.

Therefore, the dam DAM may be made of the same material as the first planarization layer 118 and the second planarization layer 119, but is not limited thereto.

The dam DAM may be formed to overlap a low-potential driving power supply line VSS. For example, the low-potential driving power supply line VSS may be formed on a lower layer of the area in which the dam DAM is positioned in the non-display area NA.

The low-potential driving power supply line VSS and the gate driving unit 300 formed in the form of the GIP may be formed in the form of surrounding an outer side of the display panel, and the low-potential driving power supply line VSS may be positioned outside the gate driving unit 300. In addition, the low-potential driving power supply line VSS may be connected to the cathode electrode CAT, and a common voltage may be applied thereto. The gate driving unit 300 is simply illustrated in plan and cross-sectional views, but may be formed by using a thin film transistor with the same structure as the thin film transistor in the display area AA.

The low-potential driving power supply line VSS is disposed outside the gate driving unit 300. The low-potential driving power supply line VSS is disposed outside the gate driving unit 300 and surrounds the display area AA. For example, the low-potential driving power supply line VSS may be made of the same material as the first gate electrode GE1, but is not limited thereto, and may be made of the same material as the second electrode CST2 or the first source and drain electrodes SD1 and SD2, but is not limited thereto.

In addition, the low-potential driving power supply line VSS may be electrically connected to the cathode electrode CAT. The low-potential driving power supply line VSS may supply the low-potential driving voltage EVSS to the plurality of pixels P in the display area AA.

A touch layer may be disposed on the encapsulation layer 120. In the touch layer, a touch buffer film 151 may be positioned between a touch sensor metal including touch electrode connection lines 152 and 154 and touch electrodes 155 and 156 and the cathode electrode CAT of the light emitting element EL.

The touch buffer film 151 can block a chemical solution (developer, etchant, or the like) used in a process of manufacturing the touch sensor metal disposed on the touch buffer film 151 or external moisture or the like from flowing into the light emitting layer EL including the organic material. Therefore, the touch buffer film 151 can prevent damage to the light emitting layer EL vulnerable to a chemical solution or moisture.

The touch buffer film 151 may be formed at a predetermined temperature (e.g., a low temperature of 100° C. or lower) and made of an organic insulating material with a low dielectric constant of 1 to 3 in order to prevent or at least reduce damage to the light emitting layer 172 including an organic material vulnerable to high temperatures. For example, the touch buffer film 151 may be made of an acrylic-based, epoxy-based, or siloxan-based material. The touch buffer film 151 made of an organic insulating material and having planarization performance can prevent damage to the encapsulation layer 120 due to the bending of the OLED display device and cracking of the touch sensor metal formed on the touch buffer film 151.

According to the mutual-capacitance-based touch sensor structure, the touch electrodes 155 and 156 may be disposed on the touch buffer film 151, and the touch electrodes 155 and 156 may be disposed to cross each other.

The touch electrode connection lines 152 and 154 may electrically connect the touch electrodes 155 and 156. The touch electrode connection lines 152 and 154 and the touch electrodes 155 and 156 may be positioned on different layers with the touch insulating film 153 interposed therebetween.

The touch electrode connection lines 152 and 154 may be disposed to overlap the bank layer 165, thereby preventing a reduction in an aperture ratio.

Meanwhile, a portion of the touch electrode connection line 152 may be electrically connected to the touch driving circuit (not illustrated) through a touch pad PAD after passing an upper portion and a side surface of the encapsulation layer 120 and an upper portion and a side surface of the dam DAM.

The portion of the touch electrode connection line 152 may transmit the touch driving signal to the touch electrodes 155 and 156 after receiving a touch driving signal from the touch driving circuit and transmit touch sensing signals from the touch electrodes 155 and 156 to the touch driving circuit.

A touch protective layer 157 may be disposed on the touch electrodes 155 and 156. In the drawing, the touch protective layer 157 is illustrated as being disposed only on the touch electrodes 155 and 156, but is not limited thereto, and the touch protective layer 157 may extend to an area before or after the dam DAM and may be disposed on the touch electrode connection line 152.

In addition, a color filter (not illustrated) may be further disposed on the encapsulation layer 120, and the color filter may be positioned on the touch layer or positioned between the encapsulation layer 120 and the touch layer.

Figure 3:
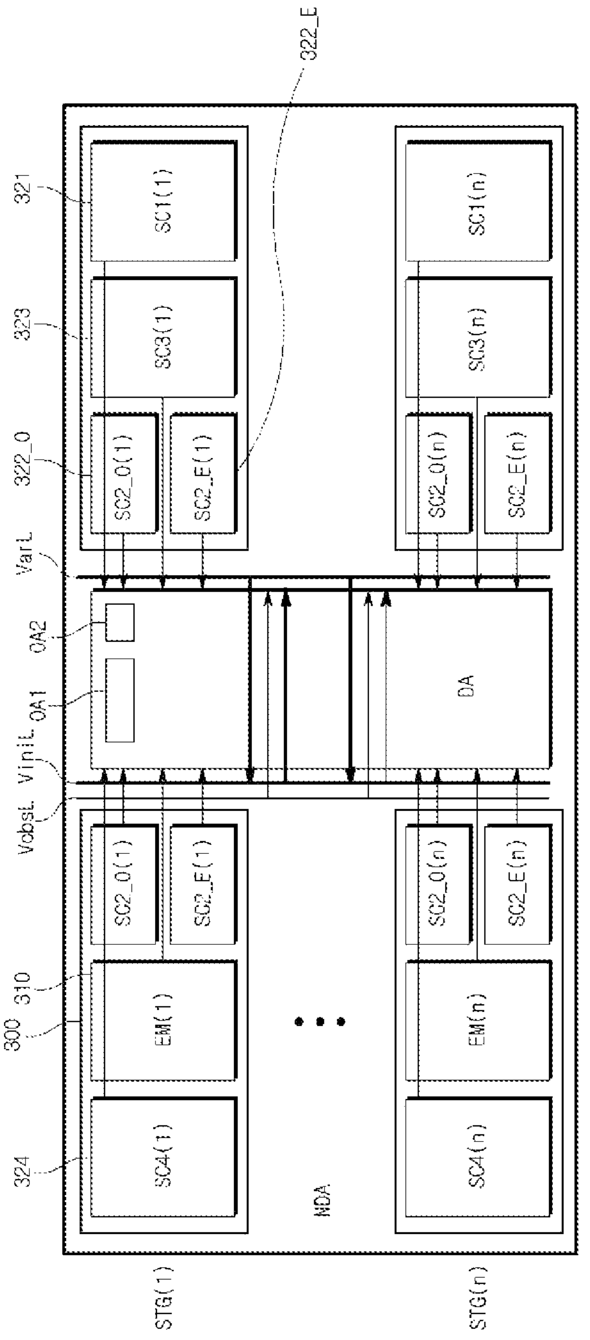
FIG. 3 is a view illustrating a configuration of a gate driving unit in the display apparatus according to one embodiment.

FIG. 3 is a view illustrating a configuration of a gate driving unit in the display apparatus according to one embodiment.

Referring to FIG. 3, the gate driving unit 300 includes a light emitting control signal driver 310 and a scan driver 320. The scan driver 320 may include a first scan driver 321 to a fourth scan driver 321, 322, 323, and 324. In addition, the second scan driver 322 may include an odd-numbered second scan driver 322_O and an even-numbered second scan driver 322_E.

The gate driving unit 300 may have shift registers formed symmetrically at both sides of the display area AA. In addition, in the gate driving unit 300, the shift register at one side of the display area AA may include the second scan drivers 322_O and 322_E, the fourth scan driver 324, and the light emitting control signal driver 310, and the shift register at the other side of the display area AA may include the first scan driver 321, the second scan drivers 322_O and 322_E, and the third scan driver 323. However, the present disclosure is not limited thereto, and the light emitting control signal driver 310, the first scan driver to the fourth scan driver 321, 322, 323, and 324 may be disposed differently according to the embodiments.

Stages STG1 to STGn of the shift register may include first scan signal generators SC1(1) to SC1(n), second scan signal generators SC2_O(1) to SC2_O(n) and SC2_E(1) to SC2_E(n), the third scan signal generators SC3(1) to SC3(n), the fourth scan signal generators SC4(1) to SC4(n), and light emitting control signal generators EM(1) to EM(n), respectively.

The first scan signal generators SC1(1) to SC1(n) output first scan signals SC1(1) to SC1(n) through first scan lines SCL1 of the display panel 100. The second scan signal generators SC2(1) to SC2(n) output second scan signals SC2(1) to SC2(n) through second scan lines SCL2 of the display panel 100. The third scan signal generators SC3(1) to SC3(n) output third scan signals SC3(1) to SC3(n) through third scan lines SCL3 of the display panel 100. The fourth scan signal generators SC4(1) to SC4(n) output fourth scan signals SC4(1) to SC4(n) through fourth scan lines SCL4 of the display panel 100. The light emitting control signal generators EM(1) to EM(n) output light emitting control signals EM(1) to EM(n) through light emitting control lines EML of the display panel 100.

The first scan signals SC1(1) to SC1(n) may be used as signals for driving an Ath transistor (e.g., a compensation transistor) included in the pixel circuit. The second scan signals SC2(2) to SC2(n) may be used as signals for driving a Bth transistor (e.g., a data supply transistor) included in the pixel circuit. The third scan signals SC3(3) to SC3(n) may be used as signals for driving a Cth transistor (e.g., a bias transistor) included in the pixel circuit. The fourth scan signals SC4(4) to SC4(n) may be used as signals for driving a Dth transistor (e.g., an initialization transistor) included in the pixel circuit. The light emitting control signals EM(1) to EM(n) may be used as signals for driving an Eth transistor (e.g., a light emitting control transistor) included in the pixel circuit. For example, when the light emitting control transistors of the pixels are controlled by using the light emitting control signals EM(1) to EM(n), a light emitting time of the light emitting element varies.

Referring to FIG. 3, a bias voltage bus line VobsL, a first initialization voltage bus line VarL, and a second initialization voltage bus line ViniL may be disposed between the gate driving unit 300 and the display area AA.

The bias voltage bus line VobsL, the first initialization voltage bus line VarL, and the second initialization voltage bus line ViniL may supply a bias voltage Vobs, a first initialization voltage Var, and a second initialization voltage Vini, respectively, to the pixel circuit from the power supply unit 500.

In the drawing, the bias voltage bus line VobsL, the first initialization voltage bus line VarL, and the second initialization voltage bus line ViniL are illustrated as being positioned only at one of a left or right side of the display area AA, but is not limited thereto and may be positioned at both sides thereof, and in addition, even when located at one side, a position of the left or right side is not limited.

One or more optical areas OA1 and OA2 may be disposed in the display area AA.

The one or more optical areas OA1 and OA2 may be disposed to overlap one or more optical electronic devices, such as a photographing device such as a camera (image sensor) or a detection sensor such as a proximity sensor and an illuminance sensor.

The one or more optical areas OA1 and OA2 may be formed with a light transmitting structure to have a transmittance greater than or equal to a predetermined level for an operation of the optical electronic device. In other words, the number of pixels P per unit area in one or more optical areas OA1 and OA2 may be smaller than the number of pixels P per unit area in a general area except for the optical areas OA1 and OA2 in the display area AA. In other words, resolutions of the one or more optical areas OA1 and OA2 may be lower than a resolution of the general area in the display area AA.

The light transmitting structure in the one or more optical areas OA1 and OA2 may be formed by patterning the cathode electrode in a portion in which the pixel P is not disposed. In this case, the patterned cathode electrode may be removed by using a laser, or the cathode electrode may be formed by being selectively patterned by using a material such as a cathode deposition prevention layer.

In addition, the light transmitting structure in the one or more optical areas OA1 and OA2 may be formed by separately forming the light emitting element EL and the pixel circuit in the pixel P. In other words, the light emitting element EL of the pixel P may be positioned above the optical areas OA1 and OA2, the plurality of transistors TFTs forming the pixel circuit may be disposed around the optical areas OA1 and OA2, and the light emitting element EL and the pixel circuit may be electrically connected through a transparent metal layer.

Figure 4:
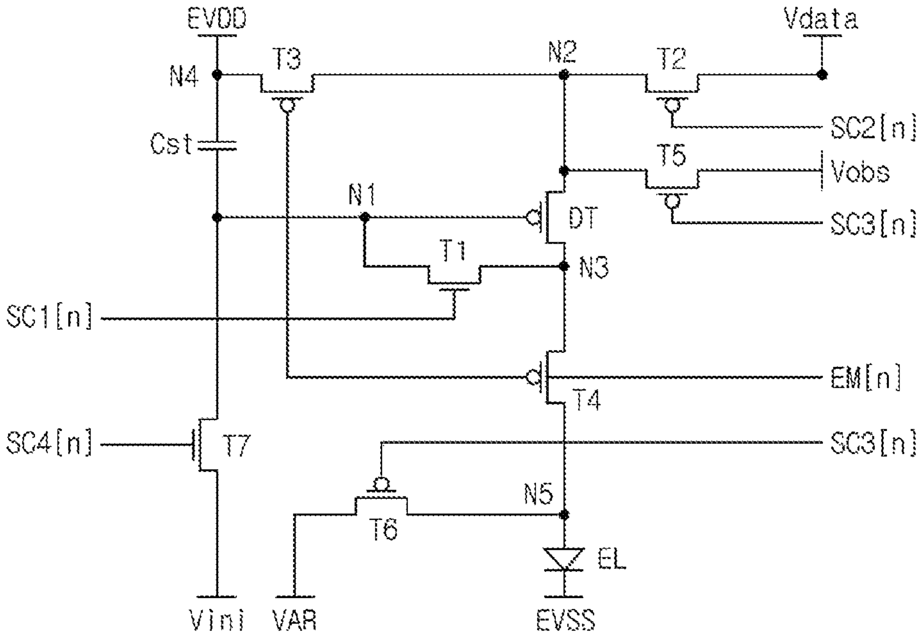
FIG. 4 is a view illustrating a pixel circuit in the display apparatus according to one embodiment.

FIG. 4 is a view illustrating a pixel circuit in the display apparatus according to one embodiment.

FIG. 4 exemplarily illustrates the pixel circuit for description, and the present disclosure is not limited thereto as long as a structure may control the light emission of the light emitting element EL by receiving the light emitting signal EM(n). For example, the pixel circuit may include an additional scan signal, a switching thin film transistor connected to the additional scan signal, and a switching thin film transistor to which an additional initialization voltage is applied, and the connection relationship of the switching elements or a connection position of a capacitor may be disposed variously. Hereinafter, for convenience of description, a display apparatus having the pixel circuit structure of FIG. 4 will be described.

Referring to FIG. 4, each of the plurality of pixels P may include a pixel circuit having a driving transistor DT, and a light emitting element EL connected to the pixel circuit.

The pixel circuit may drive the light emitting element EL by controlling a driving current flowing in the light emitting element EL. The pixel circuit may include the driving transistor DT, first to seventh transistors T1 to T7, and a capacitor CST. Each of the transistors DT, T1 to T7 may include a first electrode, a second electrode, and a gate electrode. One of the first electrode and the second electrode may be a source electrode, and the other of the first electrode and the second electrode may be a drain electrode.

Each of the transistors DT and T1 to T7 may be a p-type thin film transistor or an n-type thin film transistor. In the embodiment of FIG. 4, the first transistor T1 and the seventh transistor T7 are the n-type thin film transistors, and the remaining transistors DT and T2 to T6 are the p-type thin film transistors. However, the present disclosure is not limited thereto, and all or some of the transistors DT and T1 to T7 may be the p-type thin film transistors or the n-type thin film transistors according to the embodiments. In addition, the n-type thin film transistor may be an oxide thin film transistor, and the p-type thin film transistor may be a polycrystalline silicon thin film transistor.

Hereinafter, an example in which the first transistor T1 and the seventh transistor T7 are the n-type thin film transistors, and the remaining transistors DT and T2 to T6 are the p-type thin film transistors will be described. Therefore, the first transistor T1 and the seventh transistor T7 are turned on by receiving a high voltage, and the remaining transistors DT and T2 to T6 are turned on by receiving a low voltage.

According to one example, the first transistor T1 forming the pixel circuit may function as a compensation transistor, the second transistor T2 may function as a data supply transistor, the third and fourth transistors T3 and T4 may function as light emitting control transistors, the fifth transistor T5 may function as a bias transistor, and the sixth and seventh transistors T6 and T7 may function as initialization transistors.

The light emitting element EL may include an anode electrode and a cathode electrode. The anode electrode of the light emitting element EL may be connected to a fifth node N5, and the cathode electrode may be connected to the low-potential driving voltage EVSS.

The driving transistor DT may include a first electrode connected to a second node N2, a second electrode connected to a third node N3, and a gate electrode connected to a first node N1. The driving transistor DT may provide a driving current Id to the light emitting element EL based on a voltage (or a data voltage stored in the capacitor Cst to be described below) at the first node N1.

The first transistor T1 may include a first electrode connected to the first node N1, a second electrode connected to the third node N3, and a gate electrode for receiving a first scan signal SC1(*n*). The first transistor T1 may be turned on in response to the first scan signal SC1(*n*) and diode-connected between the first node N1 and the third node N3 to sample a threshold voltage (Vth) of the driving transistor DT. The first transistor T1 may be a compensation transistor.

The capacitor Cst may be connected or formed between the first node N1 and a fourth node N4. The capacitor Cst may store or maintain the provided high-potential driving voltage EVDD.

The second transistor T2 may include a first electrode connected to a data line DL (or for receiving the data voltage Vdata), a second electrode connected to the second node N2, and a gate electrode for receiving a second scan signal SC2(*n*). The second transistor T2 may be turned on in response to the second scan signal SC2(*n*) and may transmit the data voltage Vdata to the second node N2. The second transistor T2 may be a data supply transistor.

The third transistor T3 and the fourth transistor T4 (or the first and second light emitting control transistors) may be connected between the high-potential driving voltage EVDD and the light emitting element EL and may form a current movement path through which the driving current Id generated by the driving transistor DT flows.

The third transistor T3 may include a first electrode connected to the fourth node N4 and for receiving the high-potential driving voltage EVDD, a second electrode connected to the second node N2, and a gate electrode for receiving the light emitting control signal EM(n).

The fourth transistor T4 may include a first electrode connected to the third node N3, a second electrode connected to the fifth node N5 (or the anode electrode of the light emitting element EL), and a gate electrode for receiving the light emitting control signal EM(n).

The third and fourth transistors T3 and T4 are turned on in response to the light emitting control signal EM(n), and in this case, the driving current Id may be provided to the light emitting element EL, and the light emitting element EL may emit light with luminance corresponding to the driving current Id.

The fifth transistor T5 may include a first electrode for receiving a bias voltage Vobs, a second electrode connected to the second node N2, and a gate electrode for receiving the third scan signal SC3(*n*). The fifth transistor T5 may be a bias transistor.

The sixth transistor T6 may include a first electrode for receiving the first initialization voltage Var, a second electrode connected to the fifth node N5, and a gate electrode for receiving the third scan signal SC3(*n*).

The sixth transistor T6 may be turned on in response to the light emitting control signal SC3(*n*) before the light emitting element EL emits light (or after the light emitting element EL emits light) and may initialize the anode electrode (or the pixel electrode) of the light emitting element EL using the first initialization voltage Var. The light emitting element EL may have a parasitic capacitor formed between the anode electrode and the cathode electrode. In addition, while the light emitting element EL emits light, the parasitic capacitor may be charged so that the anode electrode of the light emitting element EL may have a specific voltage. Therefore, the amount of charge accumulated in the light emitting element EL may be initialized by applying the first initialization voltage Var to the anode electrode of the light emitting element EL through the sixth transistor T6.

In the specification, the gate electrodes of the fifth and sixth transistors T5 and T6 are formed to commonly receive the third scan signal SC3(*n*). However, the present disclosure is not necessarily limited thereto, and the gate electrodes of the fifth and sixth transistors T5 and T6 may be formed to be independently controlled by receiving separate scan signals.

The seventh transistor T7 may include a first electrode for receiving the second initialization voltage Vini, a second electrode connected to the first node N1, and a gate electrode for receiving the fourth scan signal SC4(*n*).

The seventh transistor T7 may be turned on in response to the fourth scan signal SC4(*n*) and may initialize the gate electrode of the driving transistor DT using the second initialization voltage Vini. Unnecessary charges may remain in the gate electrode of the driving transistor DT due to the high-potential driving voltage EVDD stored in the capacitor Cst. Therefore, the amount of the remaining charges may be initialized by applying the second initialization voltage Vini to the gate electrode of the driving transistor DT through the seventh transistor T7.

Figure 5A:
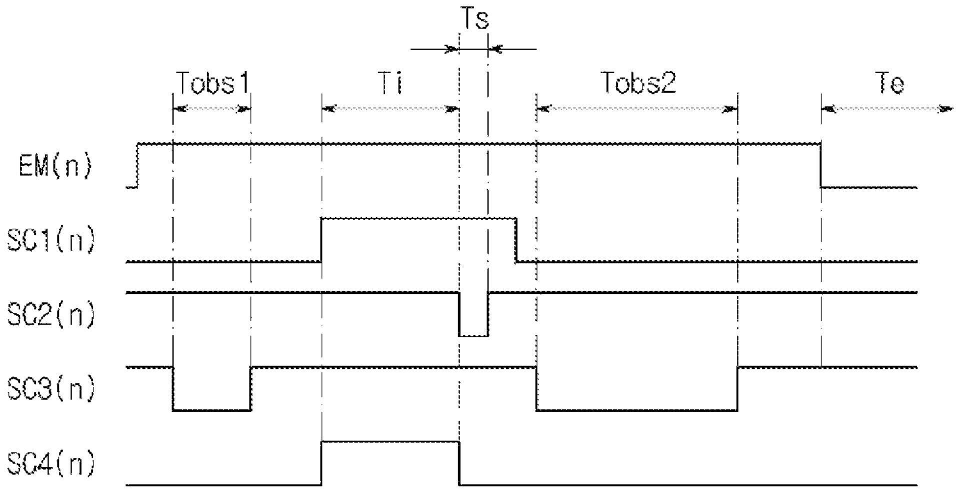
FIGS. 5A and 5B are views for describing an operation of a scan signal and a light emitting control signal in a refresh period and a hold period in the pixel circuit illustrated in FIG. 4 according to one embodiment.
Figure 5B:
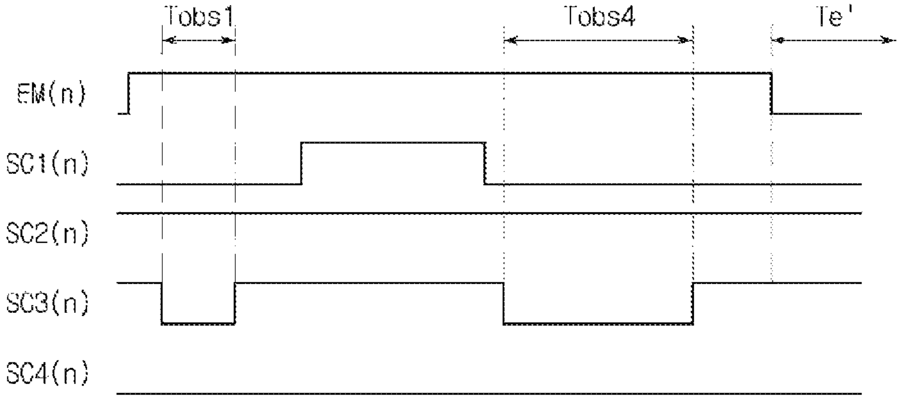

FIGS. 5A and 5B are views for describing an operation of a scan signal and a light emitting control signal in a refresh period and a hold period in the pixel circuit illustrated in FIG. 4, according to one embodiment.

The display apparatus according to one embodiment may be operated as a variable refresh rate (VRR) mode display apparatus. In the VRR mode, a pixel may be driven at a general frequency and then operated by increasing a refresh rate with updated data voltage Vdata at a time point at which high-speed driving is required, or the pixel may be operated by decreasing the refresh rate at a time point at which power consumption is decreased or low-speed driving is required.

Each of the plurality of pixels P may be driven through a combination of a refresh frame and a hold frame within 1 second. In the specification, one set is defined as a repeated combination of a refresh period in which the data voltage Vdata is updated and a hold period in which the data voltage Vdata is not updated for 1 second. In addition, a period of one set becomes a cycle in which the combination of the refresh period and the hold period is repeated.

When the pixel is driven at the refresh rate of 120 Hz, the pixel may be driven only with the refresh period. For example, the pixel may be driven during the refresh period of 120 times for 1 second. One refresh period is 1/120=8.33 ms, and the period of one set is also 8.33 ms.

When the pixel is driven at the refresh rate of 60 Hz, the pixel may be driven by alternating the refresh period and the hold period. For example, the pixel may be driven during the refresh period and the hold period each alternating 60 times for 1 second. Each period of one refresh period and one hold period is 0.5/60=8.33 ms, and the period of one set is 16.66 ms.

When the pixel is driven at the refresh rate of 1 Hz, the pixel may be driven during one frame including one refresh period and 119 hold periods after the one refresh period. When the pixel is driven at the refresh rate of 1 Hz, the pixel may be driven during one frame including a plurality of refresh periods and a plurality of hold periods. In this case, each period of one refresh period and one hold period is 1/120=8.33 ms, and one set is 1 s.

In the refresh period, a new data voltage Vdata is charged, and the new data voltage Vdata is applied to the driving transistor DT, while in the hold period, a data voltage Vdata of a previous frame is used by being maintained as it is. The hold period may also be referred to as a skip period in the sense that a process of applying the new data voltage Vdata to the driving transistor DT is omitted.

In each of the plurality of pixels P, the data voltage may be charged in the pixel circuit or the remaining voltage in the pixel circuit may be initialized in the refresh period. Specifically, in each of the plurality of pixels P, the influence of the data voltage Vdata stored in the previous frame and the high-potential driving voltage EVDD may be removed in the refresh period. Therefore, in each of the plurality of pixels P, an image corresponding to the new data voltage Vdata may be displayed in the hold period.

In each of the plurality of pixels P, the image may be displayed by providing a driving current corresponding to the data voltage Vdata to the light emitting element EL in the hold period, and a turn-on state of the light emitting element EL may be maintained.

First, the driving of the pixel circuit and the light emitting element in the refresh period in FIG. 5A will be described. The refresh period may be operated by including at least one bias period Tobs1 and Tobs2, an initialization section Ti, a sampling section Ts, and a light emitting section Te, but it is only one embodiment, and the present disclosure is not necessarily limited to this order.

Referring to FIG. 5A, the pixel circuit may be operated by including the at least one bias section Tobs1 and Tobs2 in the refresh period.

The at least one bias section Tobs1 and Tobs2 is a section in which an On-bias stress (OBS) operation to which the bias voltage Vobs is applied is performed, the light emitting control signal EM(n) has a high voltage, and the third and fourth transistors T3 and T4 are turned off. The first scan signal SC1(*n*) and the fourth scan signal SC4(*n*) have low voltages, and the first transistor T1 and the seventh transistor T7 are turned off. The second scan signal SC2(*n*) has a high voltage, and the second transistor T2 is turned off.

The third scan signal SC3(*n*) with a low voltage is input, and the fifth and sixth transistors T5 and T6 are turned on. As the fifth transistor T5 is turned on, the bias voltage Vobs is applied to the first electrode of the driving transistor DT connected to the second node N2.

Here, since the bias voltage Vobs is supplied to the third node N3, which is the drain electrode of the driving transistor DT, a charging time or charging delay of a voltage of the fifth node N5, which is the anode electrode of the light emitting element EL, may be decreased in a light emitting period. The driving transistor DT maintains a stronger saturation state.

For example, as the bias voltage Vobs increases, the voltage of the third node N3, which is the drain electrode of the driving transistor DT, may increase, and a gate-source voltage or drain-source voltage of the driving transistor DT may decrease. Therefore, it is preferable that the bias voltage Vobs is at least greater than the data voltage Vdata.

In this case, a magnitude of a drain-source current Id passing through the driving transistor DT may be decreased, and the charging delay of the voltage of the third node N3 may be resolved by reducing the stress of the driving transistor DT in a positive bias stress situation. In other words, when the OBS operation is performed before a threshold voltage (Vth) of the driving transistor DT is sampled, it is possible to mitigate a hysteresis of the driving transistor DT.

Therefore, the OBS operation in the at least one bias section Tobs1 and Tobs2 may be defined as an operation of directly applying an appropriate bias voltage to the driving transistor DT in non-light emitting periods.

In addition, as the sixth transistor T6 is turned on in the at least one bias section Tobs1 and Tobs2, the anode electrode (or the pixel electrode) of the light emitting element EL connected to the fifth node N5 is initialized to the first initialization voltage Var.

However, each of the gate electrodes of the fifth and sixth transistors T5 and T6 may be formed to be independently controlled by receiving a separate scan signal. In other words, the simultaneous application of the bias voltage to the first electrode of the driving transistor DT and the anode electrode of the light emitting element EL in the bias section is not necessarily required.

Referring to FIG. 5A, the pixel circuit may be operated by including the initialization section Ti in the refresh period. The initialization section Ti is a section in which a voltage of the gate electrode of the driving transistor DT is initialized.

The first scan signal SC1(*n*) to the fourth scan signal SC4(*n*) and the light emitting control signal EM(n) have high voltages, and the first transistor T1 and the seventh transistor T7 are turned on. The second to sixth transistors T2, T3, T4, T5, and T6 are turned off. As the first and seventh transistors T1 and T7 are turned on, the gate electrode and the second electrode of the driving transistor DT connected to the first node N1 are initialized to the second initialization voltage Vini.

Referring to FIG. 5A, the pixel circuit may be operated by including a sampling section Ts in the refresh period. The sampling section is a section in which the threshold voltage (Vth) of the driving transistor DT is sampled.

The first scan signal SC1(*n*), the third scan signal SC3(*n*), and the light emitting control signal EM(n) have high voltages, and the second scan signal SC2(*n*) and the fourth scan signal SC4(*n*) with low voltages are input. Therefore, the third to seventh transistors T3, T4, T5, T6, and T7 are turned off, the first transistor T1 maintains the ON state, and the second transistor T2 is turned on. In other words, the second transistor T2 is turned on so that the data voltage Vdata is applied to the driving transistor DT, and the first transistor T1 may be diode-connected between the first node N1 and the third node N3 to sample the threshold voltage Vth of the driving transistor DT.

Referring to FIG. 5A, the pixel circuit may be operated by including the light emitting section Te in the refresh period. The light emitting section Te is a section in which the sampled threshold voltage (Vth) is canceled and the light emitting element EL emits light with a driving current corresponding to the sampled data voltage.

The light emitting control signal EM(n) has a low voltage, and the third and fourth transistors T3 and T4 are turned on.

As the third transistor T3 is turned on, the high-potential driving voltage EVDD connected to the fourth node N4 is applied to the first electrode of the driving transistor DT connected to the second node N2 through the third transistor T3. Since the driving current Id supplied from the driving transistor DT to the light emitting element EL via the fourth transistor T4 is irrelevant to a value of the threshold voltage (Vth) of the driving transistor DT, the pixel circuit is operated at the compensated threshold voltage (Vth) of the driving transistor DT.

Next, referring to FIG. 5B, the operation of the pixel circuit and the light emitting element in the hold period will be described.

The hold period may include at least one bias period Tobs3 and Tobs4 and a light emitting section Te'. Description of the same operation of the pixel circuit as the operation in the refresh period will be omitted.

As described above, there is a difference in that in the refresh period, the new data voltage Vdata is charged and the new data voltage Vdata is applied to the gate electrode of the driving transistor DT, while in the hold period, the data voltage Vdata in the refresh period is used by being maintained as it is. Therefore, unlike the refresh period, the initialization section Ti and the sampling section Ts are not required in the hold period.

Only one OBS operation may be sufficient in the operation of the hold period. However, in the present embodiment, for convenience of the driving circuit, the third scan signal SC3(*n*) in the hold period are driven identically to the third scan signal SC3(*n*) in the refresh period, and thus the OBS operation may be performed twice as in the refresh period.

A difference between the driving signal in the refresh period described with reference to FIG. 5A and the driving signal in the hold period in FIG. 5B is the second and fourth scan signals SC2(*n*) and SC4(*n*). Since the initialization section Ti and the sampling section Ts are not necessary in the hold period, unlike the refresh period, the second scan signal SC2(*n*) always has a high voltage, and the fourth scan signal SC4(*n*) always has a low voltage. In other words, the second and seventh transistors T2 and T7 are always turned off.

Figure 6:
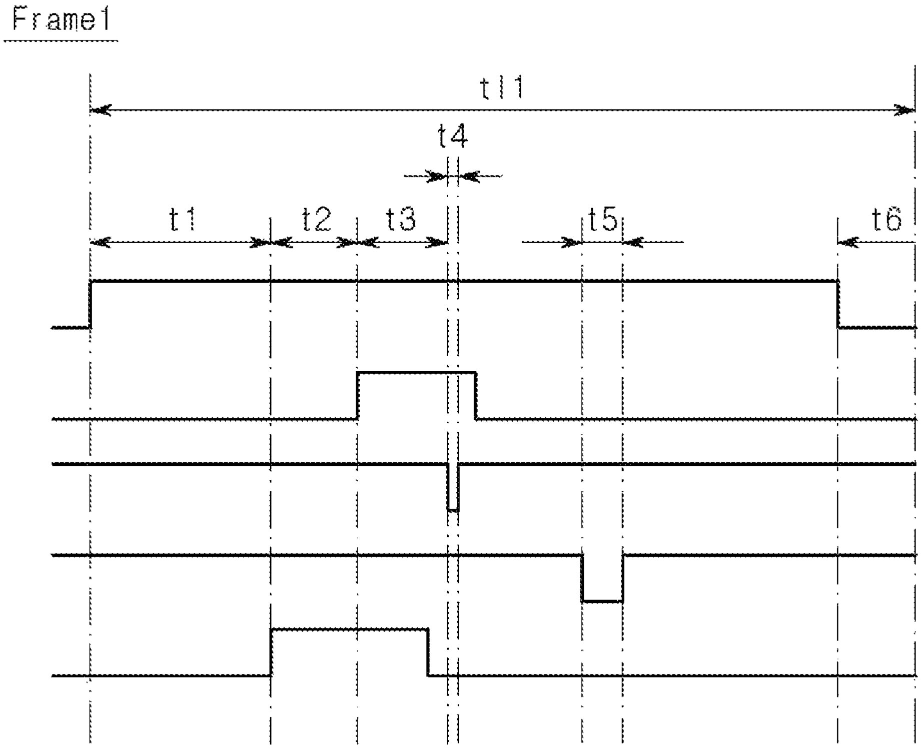
FIG. 6 is a waveform diagram illustrating signals applied to pixels of the display apparatus according to one embodiment.

FIG. 6 is a waveform diagram illustrating signals applied to pixels of the display apparatus according to one embodiment. FIG. 6 illustrates signals applied to one pixel row in a first frame Frame 1. In FIG. 6, a period during which the signals are applied to the one pixel row is referred to as a first pixel row period t11.

Referring to FIG. 6, in a first period t1, the light emitting control signal EM(n) at a turn-off voltage level is applied to turn off the third and fourth transistors T3 and T4.

In a second period t2, the fourth scan signal SC4(*n*) at a turn-on voltage level is applied to turn on the seventh transistor T7, and the second initialization voltage Vini is applied to the gate electrode of the driving transistor DT or the first node N1. The second initialization voltage Vini may have a voltage level that turns on the driving transistor DT. In the second period t2, a sufficiently low voltage is applied to the first node N1.

In a third period t3, the first scan signal SC1(*n*) at the turn-on voltage level is applied to turn on the first transistor T1, and the first node N1 and the third node N3 are connected to diode-connect the driving transistor DT. In the third period t3, the seventh transistor T7 is turned off by the fourth scan signal SC4(*n*) at the turn-off voltage level.

In a fourth period t4, the second scan signal SC2(*n*) at the turn-on voltage level is applied to turn on the second transistor T2. The data voltage Vdata is applied to the second node N2 or the first electrode of the driving transistor DT. Since the second initialization voltage Vini applied to the gate electrode of the driving transistor DT in the second period t2 has the voltage level that turns on the driving transistor DT, the driving current flows from the first electrode to the second electrode of the driving transistor DT, and a voltage of the second electrode (or the third node N3) of the driving transistor DT is increased to the same voltage value as the sum of the data voltage Vdata and the threshold voltage (Vth) from a magnitude of the second initialization voltage Vini.

In a fifth period t5, the third scan signal SC3(*n*) at the turn-on voltage level is applied.

When the third scan signal (e.g., SC3(*n*)) at the turn-on voltage level is applied, the fifth and sixth transistors T5 and T6 are turned on. Therefore, the first initialization voltage Var is applied to the anode electrode (or the fifth node N5) of the light emitting element EL, and the bias voltage Vobs is applied to the second node N2. For example, the first initialization voltage Var may have a smaller voltage value than the bias voltage Vobs. In other words, in a period in which the third scan signal (e.g., SC3(*n*)) is applied, the first initialization voltage Var is applied to the anode electrode (or the fifth node N5) of the light emitting element EL, and the bias voltage Vobs is applied to the third node N3.

Then, in a sixth period t6, the light emitting control signal EM(n) at the turn-on voltage level is applied to turn on the third and fourth transistors T3 and T4. As described above, in the period in which the third scan signal (e.g., SC3(*n*)) is applied, the first initialization voltage Var is applied to the anode electrode (or the fifth node N5) of the light emitting element EL, and when the fourth transistor T4 is turned on in a state in which the bias voltage Vobs is applied to the third node N3, the driving current may flow from the third node N3 to the fifth node N5.

Figure 7:
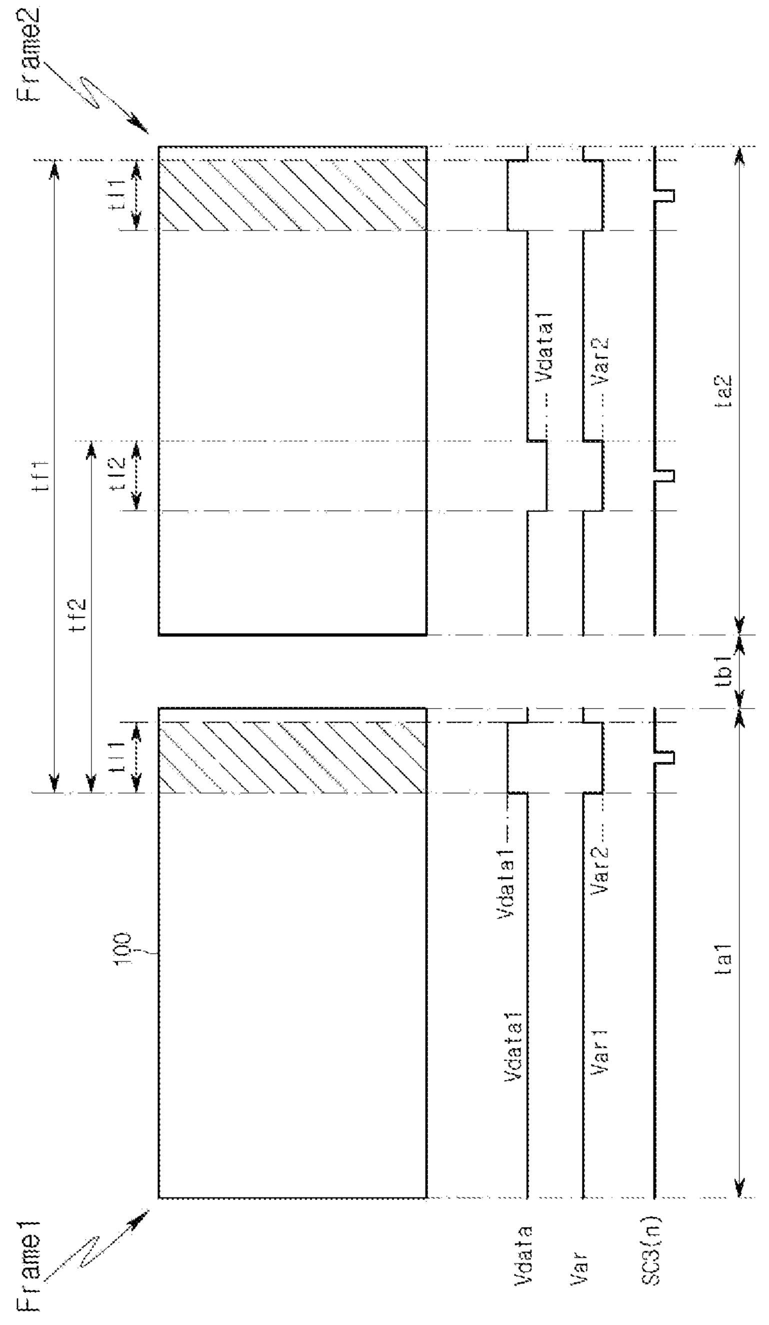
FIG. 7 is a waveform diagram illustrating signals applied to the pixels in a first frame and a second frame according to one embodiment.
Figure 8:
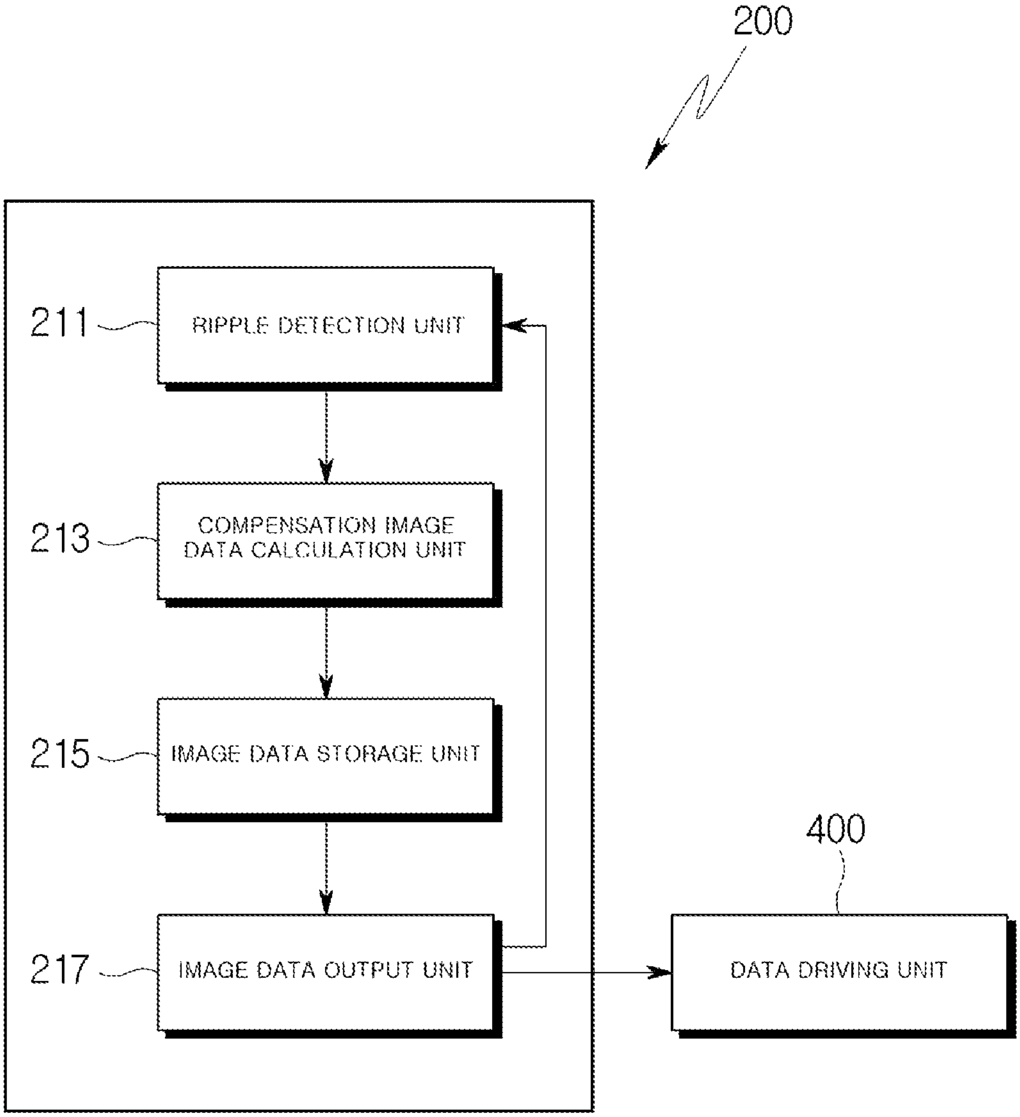
FIG. 8 is a block diagram illustrating specific components of a controller according to one embodiment.

FIG. 7 is a waveform diagram illustrating signals applied to the pixels in a first frame and a second frame, according to one embodiment. FIG. 8 is a block diagram illustrating specific components of a controller according to one embodiment. FIG. 7 illustrates signals applied to one pixel row (hereinafter referred to as a first pixel row) in the first frame Frame 1 and signals applied to another pixel row (hereinafter referred to as a second pixel row) in the second frame Frame 2 after the first frame Frame 1. In FIG. 7, a period during which the signals are applied to another pixel row is referred to as a second pixel row period tl2.

In one embodiment, each of the first and second frames Frame 1 and Frame 2 may be driven with a first driving frequency. Furthermore, the light emitting control signal EM(n), the first scan signal SC1(*n*), the second scan signal SC2(*n*), and the fourth scan signal SC4(*n*) of the first and second frames Frame 1 and Frame 2 may also be driven with the first driving frequency. On the other hand, the third scan signal SC3(*n*) may be driven with a second driving frequency higher than the first driving frequency. For example, the second driving frequency may have twice the first driving frequency. For example, the first driving frequency may be 120 Hz, and the second driving frequency may be 240 Hz, but the present disclosure is not limited thereto. In some embodiments, a driving frequency of the light emitting control signal EM(n) may differ from the first and second driving frequencies, but the present disclosure is not limited thereto. Since each of the first and second frames Frame 1 and Frame 2 is driven with the first driving frequency and the third scan signal SC3(*n*) is driven with the second driving frequency that is twice the first driving frequency, a period tf1 of the first and second frames Frame 1 and Frame 2 may be twice a period tf2 of the third scan signal SC3(*n*).

Referring to FIGS. 4, 6, and 7, a data voltage Vdata at a second voltage level Vdata2 different from a first voltage level Vdata1 is supplied to the first pixel row in the first frame Frame 1. In other words, the data voltage Vdata at the second voltage level Vdata2 is supplied in the first pixel row period t11. The second voltage level Vdata2 may be greater than the first voltage level Vdata1. For example, the voltage levels Vdata1 and Vdata2 may be average voltage levels of the plurality of pixels (see P in FIG. 1) included in the first pixel row. The second voltage level Vdata2 may be a voltage level greater than or equal to a reference data voltage level.

As described above with reference to FIG. 4, in the sixth period t6, the light emitting control signal EM(n) at the turn-on voltage level is applied to turn on the third and fourth transistors T3 and T4. As described above, in the period in which the third scan signal (e.g., SC3(*n*)) is applied, the first initialization voltage Var is applied to the anode electrode (or the fifth node N5) of the light emitting element EL, and when the fourth transistor T4 is turned on in a state in which the bias voltage Vobs is applied to the third node N3, the driving current may flow from the third node N3 to the fifth node N5, and a voltage of the fifth node N5 may be increased. Meanwhile, the magnitude of the driving current may be inversely proportional to the magnitude of the data voltage Vdata. The data voltage Vdata at the second voltage level Vdata2 greater than the first voltage level Vdata1 may be stored in the capacitor Cst in the fourth period t4 in the first pixel row in the first frame Frame 1, and the first initialization voltage Var may be applied to the anode electrode (or the fifth node N5) of the light emitting element EL in the fifth period t5 in the first pixel row in the first frame Frame 1. Since the magnitude of the driving current is inversely proportional to the magnitude of the data voltage Vdata, when the data voltage Vdata at the second voltage level Vdata2 greater than the first voltage level Vdata1 is supplied to the first pixel row in the first frame Frame 1, as illustrated in FIG. 7, the magnitude of the first initialization voltage Var (or the voltage of the fifth node N5) supplied to the first pixel row in the first frame Frame 1 may be decreased from the first voltage level Var1 to the second voltage level Var2. A light emitting luminance of the first pixel row in the sixth period t6 in the first frame Frame 1 may be proportional to the voltage of the fifth node N5. Therefore, since the magnitude of the first initialization voltage Var (or the voltage of the fifth node N5) supplied to the first pixel row in the first frame Frame 1 is decreased from the first voltage level Var1 to the second voltage level Var2, the light emitting luminance of the first pixel row in the first frame Frame 1 may be lower than a desired luminance. Description of the first pixel row in the second frame Frame 2 will be replaced with the description of the first pixel row in the first frame Frame 1.

Meanwhile, as described above, since the second driving frequency is twice the first driving frequency, as illustrated in FIG. 7, the first initialization voltage Var (or the voltage of the fifth node N5) at the second voltage level Var2 supplied to the first pixel row may also be supplied to the second pixel row in the second frame Frame 2. A light emitting luminance of the second pixel row in the sixth period t6 in the second frame Frame 2 may be proportional to the voltage of the fifth node N5. Since the first initialization voltage Var (or the voltage of the fifth node N5) at the second voltage level Var2 supplied to the first pixel row is also supplied to the second pixel row in the second frame Frame 2, the light emitting luminance of the second pixel row in the sixth period t6 in the second frame Frame 2 may be lower than a desired light emitting luminance. Therefore, it is necessary to adjust the light emitting luminance of the second pixel row in the second frame Frame 2.

Therefore, as illustrated in FIG. 8, the controller 200 may include a ripple detection unit 211, a compensation image data calculation unit 213, an image data storage unit 215, and an image data output unit 217.

The ripple detection unit 211 (e.g., a circuit) may detect that a ripple occurs in pixel rows in the display panel 100. For example, the ripple detection unit 211 may detect that the first initialization voltage Var in a specific pixel row (e.g., the first pixel row) is decreased to a reference initialization voltage or less with a difference of a reference value or more. For example, the ripple detection unit 211 may detect that the first initialization voltage Var in the first pixel row is decreased to the second voltage level Var2, which is smaller than or equal to the reference initialization voltage level. The ripple detection unit 211 may not only detect the pixel row in which the ripple has occurred, but also detect a difference between the voltage level (e.g., the second voltage level Var2) of the pixel row in which the ripple has occurred and the first voltage level Var1 (or the reference initialization voltage level).

The ripple detection unit 211 may provide a value of the detected difference between the voltage level of the pixel row in which the ripple has occurred and the first voltage level Var1 to the compensation image data calculation unit 213.

The compensation image data calculation unit 213 (e.g., a circuit) may calculate a magnitude (or a value) of compensation image data of the second pixel row in the second frame Frame 2 based on the value of the difference between the voltage level of the pixel row in which the ripple has occurred and the first voltage level Var1. Then, the compensation image data may be converted into an analog format through the data driving unit 400. As described above, the light emitting luminance of the second pixel row in the sixth period t6 in the second frame Frame 2 may be proportional to the voltage of the fifth node N5, and the light emitting luminance of the second pixel row in the sixth period t6 in the second frame Frame 2 may be lower than the desired light emitting luminance. Therefore, in order to increase the decreased light emitting luminance, the compensation image data may be image data corresponding to a data voltage Vdata at a third voltage level Vdata3 smaller than the first voltage level Vdata1. The compensation image data may be calculated as the image data corresponding to the data voltage Vdata at the third voltage level Vdata3 based on the value of the difference between the voltage level in the pixel row in which the ripple has occurred and the first voltage level Var1. The compensation image data calculation unit 213 provides data on the calculated compensation image data to the image data storage unit 215, and the image data storage unit 215 provides compensation image data corresponding to the calculated compensation image data to the image data output unit 217. The image data output unit 217 may provide the compensation image data to the data driving unit 400.

The data voltage Vdata at the third voltage level Vdata3 in which the compensation image data has been converted into the analog format may be supplied to the data line (see DL in FIG. 1) of the second pixel row in the second frame Frame 2 in the second pixel row period tl2, thereby preventing a reduction in the light emitting luminance due to the decreased second voltage level Var2.

Figure 9:
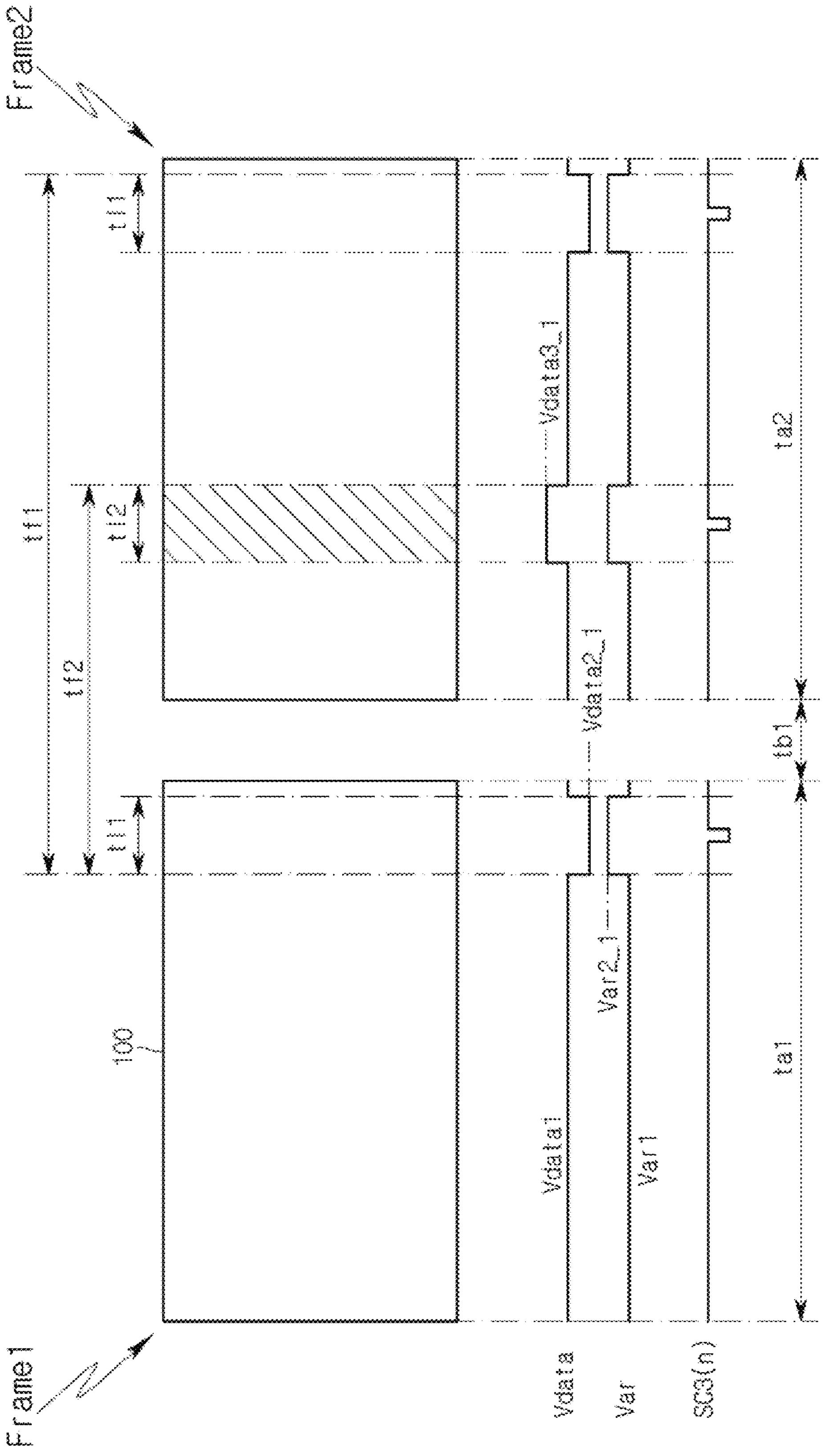
FIG. 9 is a waveform diagram illustrating signals applied to the pixels in a first frame and a second frame according to a modified example.

FIG. 9 is a waveform diagram illustrating signals applied to the pixels in a first frame and a second frame according to a modified example.

Referring to FIGS. 4, 6, 8, and 9, a data voltage Vdata at a second voltage level Vdata2_1 different from the first voltage level Vdata1 is supplied to the first pixel row in the first frame Frame 1. In other words, the data voltage Vdata at the second voltage level Vdata2_1 is supplied in the first pixel row period tl1. The second voltage level Vdata2_1 may be smaller than the first voltage level Vdata1. The second voltage level Vdata2_1 may be a voltage level smaller than or equal to the reference data voltage level.

As described above with reference to FIG. 4, in the sixth period t6, the light emitting control signal EM(n) at the turn-on voltage level is applied to turn on the third and fourth transistors T3 and T4. As described above, in the period in which the third scan signal (e.g., SC3(*n*)) is applied, the first initialization voltage Var is applied to the anode electrode (or the fifth node N5) of the light emitting element EL, and when the fourth transistor T4 is turned on in a state in which the bias voltage Vobs is applied to the third node N3, the driving current may flow from the third node N3 to the fifth node N5, and a voltage of the fifth node N5 may be increased. Meanwhile, the magnitude of the driving current may be inversely proportional to the magnitude of the data voltage Vdata. The data voltage Vdata at the second voltage level Vdata2_1 smaller than the first voltage level Vdata1 may be stored in the capacitor Cst in the fourth period t4 in the first pixel row in the first frame Frame 1, and the first initialization voltage Var may be applied to the anode electrode (or the fifth node N5) of the light emitting element EL in the fifth period t5 in the first pixel row in the first frame Frame 1.

Since the magnitude of the driving current is inversely proportional to the magnitude of the data voltage Vdata, when the data voltage Vdata at the second voltage level Vdata2_1 smaller than the first voltage level Vdata1 is supplied to the first pixel row in the first frame Frame 1, as illustrated in FIG. 7, the magnitude of the first initialization voltage Var (or the voltage of the fifth node N5) supplied to the first pixel row in the first frame Frame 1 may be increased from the first voltage level Var1 to the second voltage level Var2_1.

A light emitting luminance of the first pixel row in the sixth period t6 in the first frame Frame 1 may be proportional to the voltage of the fifth node N5. Therefore, since the magnitude of the first initialization voltage Var (or the voltage of the fifth node N5) supplied to the first pixel row in the first frame Frame 1 is increased from the first voltage level Var1 to the second voltage level Var2, the light emitting luminance of the first pixel row in the first frame Frame 1 may be higher than the desired luminance. Description of the first pixel row in the second frame Frame 2 will be replaced with the description of the first pixel row in the first frame Frame 1.

Meanwhile, as described above, since the second driving frequency is twice the first driving frequency, as illustrated in FIG. 9, the first initialization voltage Var (or the voltage of the fifth node N5) at the second voltage level Var2_1 supplied to the first pixel row may also be supplied to the second pixel row in the second frame Frame 2. A light emitting luminance of the second pixel row in the sixth period t6 in the second frame Frame 2 may be proportional to the voltage of the fifth node N5. Since the first initialization voltage Var (or the voltage of the fifth node N5) at the second voltage level Var2_1 supplied to the first pixel row is also supplied to the second pixel row in the second frame Frame 2, the light emitting luminance of the second pixel row in the sixth period t6 in the second frame Frame 2 may be higher than the desired light emitting luminance. Therefore, it is necessary to adjust the light emitting luminance of the second pixel row in the second frame Frame 2.

The ripple detection unit 211 may detect that a ripple occurs in pixel rows in the display panel 100. For example, the ripple detection unit 211 may detect that the first initialization voltage Var in a specific pixel row (e.g., the first pixel row) is increased to the reference initialization voltage or less. For example, the ripple detection unit 211 may detect that the first initialization voltage Var in the first pixel row is increased to the reference initialization voltage level or more, that is, the second voltage level Var2_1 with a difference of the reference value or more. The ripple detection unit 211 may not only detect the pixel row in which the ripple has occurred, but also detect a difference between the voltage level (e.g., the second voltage level Var2) of the pixel row in which the ripple has occurred and the first voltage level Var1.

The ripple detection unit 211 may provide a value of the detected difference between the voltage level of the pixel row in which the ripple has occurred and the first voltage level Var1 to the compensation image data calculation unit 213.

The compensation image data calculation unit 213 may calculate a magnitude (or a value) of compensation image data of the second pixel row in the second frame Frame 2 based on the value of the difference between the voltage level of the pixel row in which the ripple has occurred and the first voltage level Var1. Then, the compensation image data may be converted into the analog format through the data driving unit 400. As described above, the light emitting luminance of the second pixel row in the sixth period t6 in the second frame Frame 2 may be proportional to the voltage of the fifth node N5, and the light emitting luminance of the second pixel row in the sixth period t6 in the second frame Frame 2 may be higher than the desired light emitting luminance. Therefore, in order to increase the increased light emitting luminance, the compensation image data may be image data corresponding to a data voltage Vdata at a third voltage level Vdata3_1 greater than the first voltage level Vdata1. The compensation image data may be calculated as the image data corresponding to the data voltage Vdata at the third voltage level Vdata3_1 based on the value of the difference between the voltage level in the pixel row in which the ripple has occurred and the first voltage level Var1. The compensation image data calculation unit 213 provides data on the calculated compensation image data to the image data storage unit 215 (e.g., memory), and the image data storage unit 215 provides compensation image data corresponding to the calculated compensation image data to the image data output unit 217. The image data output unit 217 (e.g., a circuit) may provide the compensation image data to the data driving unit 400.

The data voltage Vdata at the third voltage level Vdata3_1 in which the compensation image data has been converted into the analog format may be supplied to the data line (see DL in FIG. 1) of the second pixel row in the second frame Frame 2 in the second pixel row period tl2, thereby preventing an increase in the light emitting luminance due to the increased second voltage level Var2_1.

For example, the display apparatus may include a first pixel row including a plurality of pixels each including a driving transistor including a gate electrode connected to a first node, a first electrode connected to a second electrode, and a second electrode connected to a third node and for providing a driving current to a light emitting element, a first transistor including a gate electrode to which a first scan signal is applied, a first electrode for receiving a data voltage, and a second electrode connected to a second node, and a second transistor including a gate electrode to which a second scan signal is applied, a first electrode for receiving an initialization voltage, and a second electrode connected to an anode electrode of the light emitting element, a ripple detection unit for detecting that a ripple of the initialization voltage connected to the first pixel row occurs in a first pixel row period in a first frame among a plurality of frames and detecting a difference between a voltage level of the initialization voltage of the first pixel row in which the ripple has occurred and a reference initialization voltage level, and a compensation image data calculation unit for calculating a magnitude of compensation image data based on the detected difference between the voltage level of the initialization voltage of the first pixel row in which the ripple has occurred and the reference initialization voltage level.

For example, in the display apparatus, the ripple of the initialization voltage connected to the first pixel row may occur when the difference between the voltage level of the initialization voltage of the first pixel row and the reference initialization voltage level is the reference value or more.

For example, in the display apparatus, the plurality of frames may include the first frame and the second frame after the first frame, and each of the driving frequencies of the first frame and the second frame may be lower than the driving frequency of the second scan signal.

For example, in the display apparatus, the driving frequency of the second scan signal may be twice each of the driving frequencies of the first frame and the second frame.

For example, in the display apparatus, the ripple of the initialization voltage connected to the first pixel row may occur when the voltage level of the initialization voltage of the first pixel row is decreased to the reference initialization voltage level and the reference value or more.

For example, in the display apparatus, the ripple of the initialization voltage connected to the first pixel row in the first frame may occur at the initialization voltage connected to the second pixel row in the second frame.

For example, in the display apparatus, the compensation image data may be converted into the analog format and supplied to the data line connected to the second pixel row in the second frame.

For example, in the display apparatus, the ripple of the initialization voltage connected to the first pixel row may occur when the voltage level of the initialization voltage of the first pixel row is increased to the reference initialization voltage level and the reference value or more.

For example, in the display apparatus, the ripple of the initialization voltage connected to the first pixel row in the first frame may occur at the initialization voltage connected to the second pixel row in the second frame.

For example, in the display apparatus, the compensation image data may be converted into the analog format and supplied to the data line connected to the second pixel row in the second frame.

For example, in the display apparatus, the ripple of the initialization voltage connected to the first pixel row occurs when the data voltage at the voltage level greater than or equal to the reference data voltage level is supplied to the first electrode of the first transistor in the first pixel row period.

Although one embodiment has been described above with reference to the accompanying drawings, those skilled in the art to which the specification pertains will be able to understand that the above-described technical configuration of the present disclosure can be carried out in other specific forms without changing the technical spirit or essential features thereof. Therefore, it should be understood that the above-described embodiments are illustrative and not restrictive in all respects. In addition, the scope of the specification is described by the claims to be described below rather than the detailed description. In addition, the meaning and scope of the claims and all changed or modified forms derived from the equivalent concept should be construed as being included in the scope of the specification.

| DESCRIPTION OF REFERENCE NUMERALS | |
|---|---|
| 1: display apparatus | 200: controller |
| 300: gate driving unit | 310: scan driver |
| 320: light emitting control signal driver | |

What is claimed is:

1. A display apparatus comprising:

a first pixel row and a second pixel row including a plurality of pixels, each of the plurality of pixels including a driving transistor that includes a gate electrode connected to a first node, a first electrode that is connected to a second node, and a second electrode that is connected to a third node, the driving transistor that provides a driving current to a light emitting element, a first transistor including a gate electrode to which a first scan signal is applied, a first electrode that receives a data voltage, and a second electrode that is connected to the second node, and a second transistor including a gate electrode to which a second scan signal is applied, a first electrode that receives an initialization voltage, and a second electrode that is connected to an anode electrode of the light emitting element;

a ripple detection circuit that is configured to detect that a ripple of the initialization voltage connected to the first pixel row occurs in a first pixel row period of a first frame among a plurality of frames, and detect a difference between a voltage level of the initialization voltage of the first pixel row in which the ripple occurred and a reference initialization voltage level; and a compensation image data calculation circuit that is configured to calculate a magnitude of compensation image data based on a detected difference between the voltage level of the initialization voltage of the first pixel row in which the ripple occurred and the reference initialization voltage level.

2. The display apparatus of claim 1, wherein the ripple of the initialization voltage connected to the first pixel row occurs when a difference between the voltage level of the initialization voltage of the first pixel row and the reference initialization voltage level is a reference value or greater than the reference value.

3. The display apparatus of claim 2, wherein the plurality of frames include the first frame and a second frame after the first frame, and a driving frequency of each of the first frame and the second frame is less than a driving frequency of the second scan signal.

4. The display apparatus of claim 3, wherein the driving frequency of the second scan signal is twice the driving frequency of each of the first frame and the second frame.

5. The display apparatus of claim 3, wherein the ripple of the initialization voltage connected to the first pixel row occurs when the voltage level of the initialization voltage of the first pixel row is decreased to the reference initialization voltage level and the reference value or greater than the reference value.

6. The display apparatus of claim 5, wherein the ripple of the initialization voltage connected to the first pixel row in the first frame occurs at the initialization voltage connected to the second pixel row in the second frame.

7. The display apparatus of claim 6, wherein the compensation image data is converted into an analog format and is supplied to a data line that is connected to the second pixel row in the second frame.

8. The display apparatus of claim 3, wherein the ripple of the initialization voltage connected to the first pixel row occurs when the voltage level of the initialization voltage of the first pixel row is increased to the reference initialization voltage level and the reference value or greater than the reference value.

9. The display apparatus of claim 8, wherein the ripple of the initialization voltage connected to the first pixel row in the first frame occurs at the initialization voltage connected to the second pixel row in the second frame.

10. The display apparatus of claim 9, wherein the compensation image data is converted into an analog format and supplied to a data line connected to the second pixel row in the second frame.

11. The display apparatus of claim 1, wherein the ripple of the initialization voltage connected to the first pixel row occurs when a data voltage at a voltage level greater than or equal to a reference data voltage level is supplied to the first electrode of the first transistor in the first pixel row period.

* * * * *